US011524886B2

United States Patent
Kizer et al.

(10) Patent No.: US 11,524,886 B2
(45) Date of Patent: Dec. 13, 2022

(54) INGREDIENTS CARTRIDGE FOR A BEVERAGE MIXTURE DISPENSING SYSTEM

(71) Applicant: Cana Technology, Inc., Redwood City, CA (US)

(72) Inventors: Jeffery Lance Kizer, Oakland, CA (US); Gregory Allen Springer, Los Altos, CA (US); Matthew Ambauen, San Francisco, CA (US); Stephan Weidi Tai, San Francisco, CA (US); Erik James Shahoian, Sonoma, CA (US); David Friedberg, San Francisco, CA (US); Andrés Ornelas Vargas, San Francisco, CA (US); Simon Spence, Hawthorn (AU); Peter Delmenico, Hampton (AU); Andrew Christopher Jenkins, West Heidelberg (AU); Nathan Andrew Ray, Heathmont (AU)

(73) Assignee: Cana Technology, Inc., Redwood City, CA (US)

( * ) Notice: Subject to any disclaimer, the term of this patent is extended or adjusted under 35 U.S.C. 154(b) by 0 days.

(21) Appl. No.: 17/545,699

(22) Filed: Dec. 8, 2021

(65) Prior Publication Data

US 2022/0250891 A1 Aug. 11, 2022

Related U.S. Application Data

(60) Provisional application No. 63/146,461, filed on Feb. 5, 2021.

(51) Int. Cl.
*B67D 1/00* (2006.01)
*B67D 1/08* (2006.01)
(Continued)

(52) U.S. Cl.
CPC ............ *B67D 1/0878* (2013.01); *A47J 31/40* (2013.01); *A47J 31/407* (2013.01); *A47J 31/461* (2018.08);
(Continued)

(58) Field of Classification Search
CPC ................ B67D 1/0078; B67D 1/0037; B67D 2210/00146; A47J 31/407
See application file for complete search history.

(56) References Cited

U.S. PATENT DOCUMENTS

| 4,753,370 A | 6/1988 | Rudick |
| 5,401,524 A * | 3/1995 | Burkes ................. A23L 33/165 |
| | | 426/654 |

(Continued)

FOREIGN PATENT DOCUMENTS

| GB | 2429694 A * | 3/2007 | ........... B67D 1/0025 |
| WO | 2012161935 A1 | 11/2012 | |

(Continued)

OTHER PUBLICATIONS

International Search Report dated Apr. 25, 2022 from International Application No. PCT/US2022/011575 filed Jan. 7, 2022, 4 pages.
(Continued)

*Primary Examiner* — Donnell A Long
(74) *Attorney, Agent, or Firm* — Daylight Law, P.C.

(57) ABSTRACT

A cartridge and an associated beverage mixture dispensing system are disclosed. The cartridge is detachable from the associated beverage mixture dispensing system. The cartridge includes a casing and at least twenty ingredient reservoirs located within the casing and storing at least twenty respective ingredients. The cartridge also includes a dispensing interface for dispensing the at least twenty ingredients into the beverage mixture dispensing system. The at least twenty ingredient reservoirs include a first reservoir of
(Continued)

a concentrated salt and a second reservoir of a concentrated food grade acid. The remaining ingredient reservoirs include additional concentrated ingredients. The beverage mixture dispensing system includes a solvent reservoir and a receiving interface for receiving the at least twenty ingredients from the cartridge. The beverage mixture dispensing system also includes a mixing area fluidly connected to the solvent reservoir and the at least twenty ingredient reservoirs.

27 Claims, 9 Drawing Sheets

(51) Int. Cl.
| | |
|---|---|
| *A47J 31/52* | (2006.01) |
| *F16K 37/00* | (2006.01) |
| *A47J 31/40* | (2006.01) |
| *A47J 31/46* | (2006.01) |
| *B67D 1/12* | (2006.01) |
| *B67D 1/14* | (2006.01) |
| *B01F 35/10* | (2022.01) |
| *B01F 33/84* | (2022.01) |
| *B08B 9/032* | (2006.01) |
| *B67D 1/04* | (2006.01) |
| *B67D 1/07* | (2006.01) |
| *B01F 35/71* | (2022.01) |
| *B67D 3/00* | (2006.01) |
| *B01F 35/75* | (2022.01) |
| *B01F 35/221* | (2022.01) |
| *B01F 35/21* | (2022.01) |
| *B01F 101/16* | (2022.01) |
| *A23G 9/30* | (2006.01) |
| *B01F 23/40* | (2022.01) |
| *B01F 101/21* | (2022.01) |
| *B01F 101/14* | (2022.01) |
| *B01F 35/30* | (2022.01) |

(52) U.S. Cl.
CPC ......... *A47J 31/5251* (2018.08); *B01F 33/846* (2022.01); *B01F 35/1453* (2022.01); *B01F 35/2113* (2022.01); *B01F 35/2213* (2022.01); *B01F 35/7174* (2022.01); *B01F 35/71745* (2022.01); *B01F 35/71805* (2022.01); *B01F 35/718051* (2022.01); *B01F 35/7543* (2022.01); *B08B 9/032* (2013.01); *B67D 1/0015* (2013.01); *B67D 1/0019* (2013.01); *B67D 1/0037* (2013.01); *B67D 1/0046* (2013.01); *B67D 1/0052* (2013.01); *B67D 1/0078* (2013.01); *B67D 1/0085* (2013.01); *B67D 1/04* (2013.01); *B67D 1/07* (2013.01); *B67D 1/0884* (2013.01); *B67D 1/0885* (2013.01); *B67D 1/0888* (2013.01); *B67D 1/1252* (2013.01); *B67D 1/14* (2013.01); *B67D 3/0012* (2013.01); *B67D 3/0019* (2013.01); *B67D 3/0041* (2013.01); *F16K 37/0041* (2013.01); *A23G 9/30* (2013.01); *B01F 23/483* (2022.01); *B01F 2035/351* (2022.01); *B01F 2101/14* (2022.01); *B01F 2101/16* (2022.01); *B01F 2101/21* (2022.01); *B67D 2001/0093* (2013.01); *B67D 2001/0098* (2013.01); *B67D 2001/0481* (2013.01); *B67D 2001/075* (2013.01); *B67D 2210/00013* (2013.01); *B67D 2210/00065* (2013.01); *B67D 2210/00089* (2013.01); *B67D 2210/00091* (2013.01); *B67D 2210/00146* (2013.01)

(56) References Cited

U.S. PATENT DOCUMENTS

| | | | |
|---|---|---|---|
| 6,237,810 B1 | 5/2001 | Credle, Jr. | |
| 6,277,427 B1* | 8/2001 | Husz | A23L 2/68 |
| | | | 426/74 |
| 9,394,154 B2 | 7/2016 | Connerat et al. | |
| 10,858,232 B2 | 12/2020 | Carpenter et al. | |
| 11,059,713 B1 | 7/2021 | Connor | |
| 2007/0212468 A1 | 9/2007 | White et al. | |
| 2007/0275146 A1* | 11/2007 | Catani | A23L 27/30 |
| | | | 426/548 |
| 2008/0023488 A1* | 1/2008 | Guerrero | B67D 1/0001 |
| | | | 222/129.4 |
| 2009/0308488 A1 | 12/2009 | Bennett | |
| 2011/0121032 A1* | 5/2011 | Deo | B67D 1/0032 |
| | | | 222/145.1 |
| 2014/0272019 A1* | 9/2014 | Schuh | B67D 1/0021 |
| | | | 426/115 |
| 2015/0238613 A1* | 8/2015 | Lin | A61K 8/88 |
| | | | 426/534 |
| 2015/0298956 A1 | 10/2015 | Rudick et al. | |
| 2017/0210554 A1* | 7/2017 | Black | A23P 10/40 |
| 2018/0049582 A1* | 2/2018 | Rehfuss | B67D 1/0037 |
| 2019/0106661 A1* | 4/2019 | Adam | A47J 31/407 |
| 2019/0330043 A1 | 10/2019 | Carpenter et al. | |
| 2020/0255277 A1 | 8/2020 | Stubbs et al. | |

FOREIGN PATENT DOCUMENTS

| | | | | |
|---|---|---|---|---|
| WO | WO-2013063463 A1 * | 5/2013 | | B67D 1/0878 |
| WO | 2013176921 A1 | 11/2013 | | |
| WO | 2017015576 A1 | 1/2017 | | |
| WO | 2018064454 A1 | 4/2018 | | |
| WO | 2018204240 A1 | 11/2018 | | |

OTHER PUBLICATIONS

Written Opinion of the International Searching Authority dated Apr. 25, 2022 from PCT/US2022/011575 filed on Jan. 7, 2022, 10 pages.

* cited by examiner

FIG. 4

25 Ingredient Cartridge Loadout and Concordance 400

| Ingredient | Beverage Classes |
|---|---|
| Water (Solvent) | Still Water |
| Sucrose (Solvent) | Sweetned Water |
| Fruit Flavor (e.g., Extract, Concentrates, Oils (ECO)) | Flavored Still Water |
| CO2 (Separate CO2 Tank) | Flavored Seltzer |
| Citric Acid | |
| Sodium Chloride | Electrolite Replacement Beverage |
| | Flavored Electrolite Replacement Beverage |
| Ethanol (Solvent) | |
| Potassium Sulfate | Flavored Hard Seltzer |
| Tartaric Acid | Flavored High-Ball Cocktails |
| Sodium Citrate | |
| Potassium Citrate | Flavored Carbonated Soft Drink |
| Erythritol | |
| Acesulfame K | Healthy Flavored Carbonated Soft Drink |
| | Healthy Flavored High-Ball Cocktail |
| White Grape Juice Concentrate | |
| Ascorbic Acid | |
| Niacinamide (Vit B3) | |
| Calcium Pantothenate (Vit B5) | |
| Pyridoxine Hydrochloride (Vit B6) | Flavored Electrolite Replacment And Vitamin Beverage |
| | Flavored Hydration(Sports Recovery) Beverage |
| Caffeine | |
| Malic Acid | Flavored Energy Beverage |
| Green Tea Extract 50% PP | Healthy Energy Drink |
| Sodium Phosphate Dibasic | |
| Phosphoric Acid | |
| Gum Acacia | |
| Benzoin Siam Resin | |
| Calcium Phosphate Monobasic | |
| Coffee Roasted Flavor (ECO) | |
| Coffee Chocolate Flavor (ECO) | |
| Coffee Extract | |
| Vanilla Flavor (ECO) | Cold Brew Coffee |
| | Cold Brew Sweetened Coffee |
| | Cold Brew Flavored Coffee |
| | Cold Brew Sweetened Flavored Coffee |

FIG. 5

White Wine Cartridge Loadout 500

Loadout 400 +

| Ingredient | Class |
|---|---|
| acetic acid | acid |
| lactic acid | acid |
| succinic acid | acid |
| phenylmethanol, butan-1-ol, propanol, 2-phenylethanol, 2-methylpropan-1-ol, furan-2-ylmethanol, hexan-1-ol, heptanol, 2-methylbutan-1-ol, 1-octen-3-ol, 3-methylbutan-1-ol, (Z)-hex-3-en-1-ol | alcohol |
| benzaldehyde | aldehyde |
| 4-hydroxy-3-methoxybenzaldehyde | aldehyde |
| furan-2-carbaldehyde | aldehyde |
| 5-methylfuran-2-carbaldehyde | aldehyde |
| nonanal | aldehyde |
| ethyl benzoate, ethyl 2-methylpropanoate, 2-phenyl ethyl acetate, ethyl propionat, ethyl butanoate, ethyl 3-methylbutanoate, methyl octanoate, ethyl acetate, hexyl acetate, 2-methylbutyl acetate, [(Z)-hex-3-enyl] acetate | ester |
| propanoic acid | fatty acid |
| 2-methylpropanoic acid | fatty acid |
| 3-methylbutanoic acid | fatty acid |
| (E)-1-(2,6,6-trimethylcyclohexa-1,3-dien-1-yl)but | ketone |
| oxolan-2-one | lactone |
| 5-pentyloxolan-2-one | lactone |
| 5-butyl-4-methyloxolan-2-one | lactone |
| 2-methoxyphenol | phenolic |
| 2-methoxy-4-prop-2-enylphenol | phenolic |
| 2-Methoxy-4-methylphenol | phenolic |
| potassium sulfate | salt |
| sodium phosphate dibasic | salt |
| potassium phosphate tribasic | salt |
| iron sulfate heptahydrate | salt |
| glucose | sugar |
| glycerine (glycerol) | sugar alcohol |
| 3-methylsulfanylpropan-1-ol | sulfide |
| 3,7-dimethylocta-1,6-dien-3-ol | terpene |
| 3,7-dimethyloct-6-en-1-ol | terpene |
| 2-(4-methylcyclohex-3-en-1-yl)propan-2-ol | terpene |
| 3-hydroxybutan-2-one | terpene |
| starter distillate 9x | extract |

FIG. 6

Red Wine Cartridge Loadout 600

Loadout 500 +

| | |
|---|---|
| heptanol | alcohol |
| 1-octen-3-ol | alcohol |
| cinnamaldehyde | aldehyde |
| indole | aromatic |
| methyl salicylate, methyl cinnamateisobutyl, caproateethyl, heptanoateethyl, octanoateethyl, 3-methylbutanoateethyl, decanoatelinalyl, acetateethyl, salicylatebutyl, 2-hydroxypropanoateethyl, levulinateethyl, hexanoate3-methylbutyl, acetate4-ethyl-2-methoxyphenolcis-3-hexenyl, butyratecis-3-hexenyl, hexanoatecis-3-hexenyl, propionatecis-3-hexenyl formate | ester |
| octanoic acid | fatty acid |
| butane-2,3-dione | ketone |
| beta-ionone | ketone |
| gamma-octalactongamma-octalactone fcc, delta-decalactone, gamma-decalactone fcc, gamma-dodecalactone fcc, 5-butyl-4-methyloxolan-2-one | lactone |
| 2-methoxyphenol | phenolic |
| 2-methoxy-4-prop-2-enylphenol | phenolic |
| 2-Methoxy-4-methylphenol | phenolic |
| Tannin Complex | extract |
| isoeugenol | phenylpropanoid |
| alpha-pinene | terpene |
| D-limonene | terpene |
| farnesol | terpene |
| (2E)-3,7-dimethylocta-2,6-dien-1-ol | terpene |
| nerolidol | terpene |

INGREDIENTS CARTRIDGE FOR A BEVERAGE MIXTURE DISPENSING SYSTEM

CROSS REFERENCE TO RELATED APPLICATIONS

This application claims the benefit of U.S. Provisional Patent Application No. 63/146,461 filed Feb. 5, 2021, which is incorporated by reference herein in its entirety for all purposes.

BACKGROUND

Typical beverage dispensing systems combine a diluent (e.g., water) with a basic beverage component, such as a concentrate or syrup, made up of a multitude of ingredients. However, these basic beverage components often require significant storage space and may need to be kept refrigerated to protect against spoilage. Accordingly, these basic beverage components are most likely not even stored in the same room as the beverage dispensing system, much less in the beverage dispensing system itself. In addition, each individual beverage may require its own unique basic beverage component thereby further increasing storage space and the overall footprint of the beverage dispensing system. Furthermore, typical beverage dispensing systems cannot allow for significant customization of the beverage as the individual ingredients of each component are treated as a group by the beverage dispensing system.

SUMMARY

This disclosure relates to beverage mixture dispensing systems. According to various embodiments, a beverage mixture dispensing system includes a single detachable cartridge which includes a set of concentrated ingredients. The system is enabled to prepare and dispense a variety of beverages mixtures based on a set of one or more basic solvents and this set of concentrated ingredients. The system can rely on a predefined chemical makeup of the beverage mixture for the system to prepare the beverage mixture. For example, chemical analysis of a specific wine can result in a list of chemical ingredients that make up the wine, and the systems disclosed herein utilize such a predetermined list of chemical ingredients to mix and dispense that specified wine (e.g., chardonnay). Some chemical ingredients may be dispensed in the final mixture with relatively large volume percentages (e.g., a glass of wine may have about 10-15% ethanol), whereas other components may be dispensed in a volume of less than 0.1 mL. Accordingly, a select number of common large volume chemical ingredients can be stored as solvents in independent solvent reservoirs while many low volume chemical ingredients can be stored in the detachable cartridge. The cartridge can be configured to operate with a portion of the beverage mixture dispensing system that is tuned to dispense small volumes while the solvent reservoirs can be configured to hold a large amount of liquid and be dispensed with a lower degree of precision. The ingredients from the cartridge and the solvents from the reservoirs can be combined in a mixing area of the beverage mixture dispensing system.

In specific embodiments of the invention, rather than forming a beverage mixture solely from concentrates or syrups, the systems disclosed herein form beverage mixtures based on predetermined amounts of individual chemical ingredients that make up the fluid mixture, allowing for a level of customization and choice not available to current beverage mixture dispensing systems. In some embodiments, because a small quantity (e.g., less than 0.1 mL) of an individual chemical ingredient can have a large effect on an organoleptic beverage mixture property (e.g., taste, smell, appearance, etc.), the overall storage or footprint of the system is significantly smaller than those dispensing system that rely on syrups and/or concentrates while the system also provides a greater diversity of potential beverages that can be made by the system and/or a larger number of beverages that can be made before needing to replace a component of the system. Furthermore, in accordance with specific embodiments of the invention disclosed herein, a single detachable cartridge includes a set of concentrated ingredients which allow for the formation of a large library of fluid mixtures (i.e., large diversity of potential beverages), thereby providing the user with a high degree of both convenience and variety. Additionally, the use of a single cartridge provides access to this high degree of variety with minimal waste and maximal reusability.

In specific embodiments of the invention, a careful selection of ingredients for the detachable cartridge enables the systems disclosed herein to produce a large library of beverages on a per ingredient basis (i.e., a carefully selected set of ten ingredients can make a greater variety of beverages compared to a poorly selected set of twenty ingredients). In the case of a beverage mixture dispensing system, the inventors have found that a cartridge containing as few as twenty well selected ingredients can still render a massive library of over 500 distinct beverages with a nearly limitless degree of perceptible customizations based on those distinct beverages. The process for selecting the ingredients can involve a chemical analysis of a set of beverages from a set of potential beverage classes to identify a set of ingredients, an evaluation of a degree of organoleptic similarity of ingredients from among the identified ingredients (or potential substitutes), and the selection of organoleptically indistinguishable ingredients that are common to the greatest number of desired beverages. In specific embodiments, this process can be conducted using frameworks for specific beverage classes.

In specific embodiments of the invention, a beverage mixture dispensing system is provided. The beverage mixture dispensing system comprises a solvent reservoir and a detachable cartridge having: (i) a casing; and (ii) at least 20 ingredient reservoirs located within the casing and storing at least 20 respective ingredients. The beverage mixture dispensing system further comprises a mixing area fluidly connected to the solvent reservoir and the at least 20 ingredient reservoirs. The at least 20 ingredient reservoirs include a first reservoir storing a concentrated salt as the respective ingredient of the first reservoir and a second reservoir storing a concentrated food grade acid as the respective ingredient of the second reservoir.

In specific embodiments of the invention, a detachable ingredients cartridge for a beverage mixture dispensing system is provided. The cartridge comprises a casing, at least 20 ingredient reservoirs located within the casing and storing at least 20 separate respective ingredients, and a dispensing interface for dispensing the at least 20 separate respective ingredients into the beverage mixture dispensing system. The at least 20 ingredient reservoirs include a first reservoir of a concentrated salt and a second reservoir of a concentrated food grade acid.

In specific embodiments of the invention, an ingredients cartridge is provided. The ingredients cartridge comprises at least 20 ingredient reservoirs storing at least 20 separate ingredients. The plurality of ingredient reservoirs includes a first reservoir of a concentrated salt, and a second reservoir of a concentrated food grade acid.

In specific embodiments of the invention, a particular one of the systems disclosed herein comprises a plurality of ingredient reservoirs containing respective ingredients and a combination of zero or more of each of the following components: a cartridge (also called an ingredient cartridge), optionally and/or selectively pressurizable, to contain the plurality of ingredient reservoirs; a solvent reservoir containing a respective solvent (e.g., a diluent); a solvent inlet, such as a water inlet to connect to an exterior water supply; a mixing channel; a dissolution chamber; a mixing chamber; a dispenser (e.g., a nozzle); a drip tray (e.g., waste storage); a carbonator; a heat exchanger; a pneumatic system; a pump, such as a motor-operated or a pressure-operated pump; a microfluidic pump; a fluid mixture holder sensor (to monitor whether or not a receptacle for the fluid mixture is present); a drip tray sensor (to monitor whether or not the drip tray is present and/or an amount of fluid in the drip tray); a dispensing sensor (to monitor a dispensing profile of the fluid mixture); a valve, such as an electromechanical valve; interconnection hardware such as pipes and/or tubing; a temperature sensor; a pressure sensor; a flow sensor; a user interface, such as a control panel; a controller, such as a microprocessor; and any other device, sensor, or equipment used in fluid dispensing systems.

In specific embodiments of the invention, the ingredient reservoirs contain ingredients, such as a solid (including crystalline, powdered, or other forms of a solid), a liquid, or a gas, used in the preparation of a beverage. The ingredient reservoirs can be stored in one or more ingredient cartridges. Examples of ingredients include chemicals such as citric acid (in solid form or in a solution). In specific embodiments, the ingredient reservoirs contain concentrated ingredients such as a concentrated liquid containing an pure ingredient suspended in a solvent. In specific embodiments of the invention, the ingredients are stored in the ingredient reservoirs as molecular entities independently suspended in a solvent, such as liquid water. In specific embodiments of the invention, the ingredients are stored in the ingredient reservoirs as molecular entities in liquid form. As used herein the term "molecular entity" refers to any constitutionally or isotopically distinct atom, molecule, ion, ion pair, radical, radical ion, complex, conformer, etc. which is identifiable as a separately distinguishable entity and that can be used to concisely identify a chemical in a chemical process or reaction.

In some embodiments, the ingredients in the ingredient reservoirs comprise at least one selected from the group consisting of glycerine (glycerol), fructose, glucose, lactic acid, malic acid, tartaric acid, potassium phosphate tribasic, sucrose, potassium sulfate, succinic acid, acetic acid, citric acid, tricalcium phosphate, magnesium hydroxide, 3-methylbutan-1-ol, sodium phosphate dibasic, propanol, starter distillate 9x, ethyl acetate, 2-methylbutan-1-ol, 2-methylpropan-1-ol, 2-phenylethanol, oxolan-2-one, iron sulfate heptahydrate, octanoic acid, hexanoic acid, 3-methylbutyl acetate, decanoic acid, hexan-1-ol, ethyl octanoate, furan-2-ylmethanol, ethyl hexanoate, 2-methylpropanoic acid, furan-2-carbaldehyde, ethyl butanoate, 2,6-dimethoxyphenol, ethyl decanoate, hexyl acetate, 2-phenyl ethyl acetate, 3-methylsulfanylpropan-1-ol, ethyl propionate, butan-1-ol, 4-hydroxy-3-methoxybenzaldehyde, 5-methylfuran-2-carbaldehyde, isobutyl acetate, 5-pentyloxolan-2-one, ethyl 2-methylpropanoate, 5-butyl-4-methyloxolan-2-one, 2-methoxy-4-methylphenol, 2-methoxy-4-prop-2-enylphenol, 2-methyoxyphenol, and/or coloring agents.

In specific embodiments of the invention, the solvent reservoirs contain solvents, such as a liquid or a gas, used in the preparation of a fluid mixture. In general, but not in all embodiments and/or usage scenarios, the ingredients reservoirs have a lower volume than the solvent reservoirs, and/or ingredients are used in fluid mixture in lower amounts than solvents. Examples of solvents include alcohol (e.g., ethanol or isopropanol), water, ethyl lactate, and propylene glycol. The solvent reservoirs can be stored in one or more solvent cartridges.

In specific embodiments of the invention, there are at least 20 ingredient reservoirs in a cartridge. In further embodiments, there are up to 1,000 ingredient reservoirs in a cartridge. In specific embodiments, there are two or more solvent reservoirs, but some systems have only one solvent reservoir, and other systems might not have any solvent reservoirs. For example, a non-alcoholic, diet beverage dispensing system with a carbonator requires only a water reservoir, or alternatively a water inlet (with no water reservoir required). In specific embodiments, at least some of the solvent reservoirs are replaceable and/or refillable (e.g., when an amount of solvent in the solvent reservoir is below a threshold).

According to various embodiments, an amount of a particular ingredient dispensed into a fluid mixture varies from fractions of a milliliter (e.g., 0.01 mL or less) to multiple liters (e.g., three liters). For solid or gaseous ingredients, equivalent variations in a range of the amount dispensed apply. An amount of a particular solvent used in a fluid mixture varies similarly. For example, a glass of wine has a 10% alcohol content, whereas a Manhattan cocktail has a 34% alcohol content.

In some embodiments, a plurality of ingredient reservoirs is contained in a cartridge. In further embodiments, there are multiple of such cartridges, such as with different sets of ingredient reservoirs, as spare/backup cartridges, and/or in systems with multiple dispensers. According to various embodiments, each of the ingredient reservoirs is of one or more types, such as: a bladder bag; a syringe; a gravity dispense chamber; a pellet dispenser; a pierceable volume; and any other container used for a solid (including crystalline, powdered, or other forms of a solid), a liquid, or a gas. In various embodiments, all the ingredient reservoirs in a cartridge are of a same type. In other embodiments, a cartridge contains ingredient reservoirs of two or more types. According to various embodiments, each of the ingredient reservoirs is of one or more sizes, such as: a small size (e.g., one ounce or less, or two ounces or less); a medium size (e.g., four ounces or less, or eight ounces or less); a large size (e.g., 16 ounces or less, or 32 ounces or less); and other sizes or gradations as used in differing usage scenarios. In various embodiments, all the ingredient reservoirs in a cartridge are of a same size. In other embodiments, a cartridge contains ingredient reservoirs of two or more sizes. In various embodiments, a cartridge (and the ingredient reservoirs it contains) is a replaceable unit.

It will be appreciated that any of the variations, embodiments, features and options described in view of systems disclosed herein apply equally to methods disclosed herein and vice versa. It will also be clear that any one or more of the above variations, embodiments, features and options can be combined.

Additional advantages will be readily apparent to those skilled in the art from the following detailed description. The embodiments and descriptions herein are to be regarded as illustrative in nature and not restrictive.

All publications, including patent documents, scientific articles and databases, referred to in this application are incorporated by reference in their entirety for all purposes to the same extent as if each individual publication were individually incorporated by reference. If a definition set forth herein is contrary to or otherwise inconsistent with a definition set forth in the patents, applications, published applications and other publications that are herein incorporated by reference, the definition set forth herein prevails over the definition that is incorporated herein by reference.

BRIEF DESCRIPTION OF THE DRAWINGS

FIG. 4 illustrates a concordance of a set of concentrated ingredients in an ingredients cartridge for a beverage mixture dispensing system and a set of beverages that the set of ingredients enables the beverage mixture dispensing system to make, in accordance with specific embodiments disclosed herein.

FIG. 5 illustrates a cartridge loadout for a beverage mixture dispensing system that is configured to make white wines, in accordance with specific embodiments disclosed herein.

FIG. 6 illustrates a cartridge loadout for a beverage mixture dispensing system that is configured to make red wines, in accordance with specific embodiments disclosed herein In the figures, like reference numbers correspond to like components unless otherwise stated.

DETAILED DESCRIPTION

Reference will now be made in detail to implementations and embodiments of various aspects and variations of systems and methods described herein. Although several exemplary variations of the systems and methods are described herein, other variations of the systems and methods may include aspects of the systems and methods described herein combined in any suitable manner having combinations of all or some of the aspects described.

Different components and methods for a beverage mixture dispensing system, such as device 100 illustrated in FIG. 1A, and an accompanying cartridge, such as cartridge(s) 105 in FIG. 1A, will be described in detail in this disclosure. The methods and systems disclosed in this section are nonlimiting embodiments of the invention, are provided for explanatory purposes only, and should not be used to constrict the full scope of the invention. It is to be understood that the disclosed embodiments may or may not overlap with each other. Thus, part of one embodiment, or specific embodiments thereof, may or may not fall within the ambit of another, or specific embodiments thereof, and vice versa. Different embodiments from different aspects may be combined or practiced separately. Many different combinations and sub-combinations of the representative embodiments shown within the broad framework of this invention, that may be apparent to those skilled in the art but not explicitly shown or described, should not be construed as precluded.

Figure 1A:
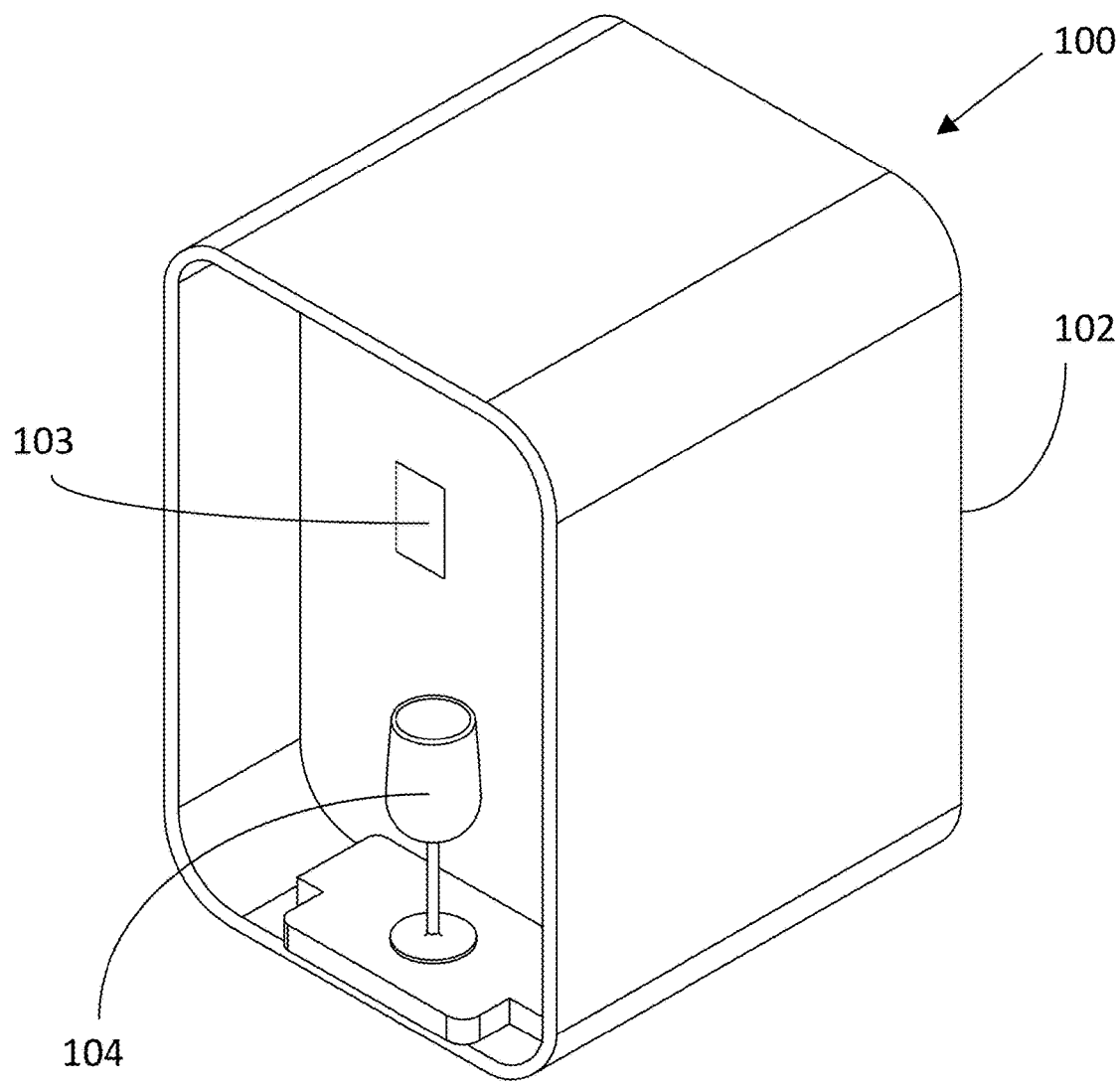
FIG. 1A illustrates an example of a beverage mixture dispensing system, in accordance with specific embodiments disclosed herein.
Figure 1B:
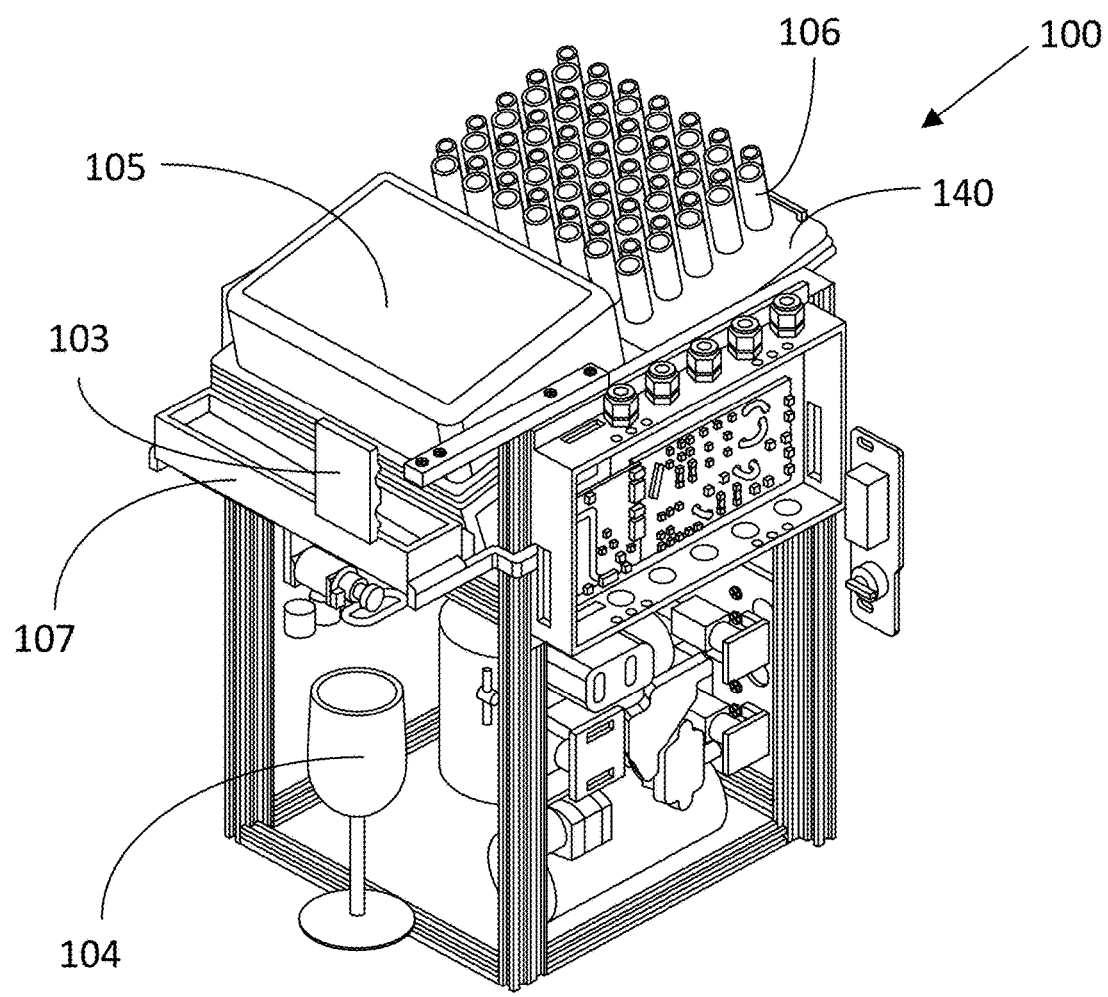
FIG. 1B illustrates the beverage mixture dispensing system of FIG. 1A without its casing, in accordance with specific embodiments disclosed herein.
Figure 1C:
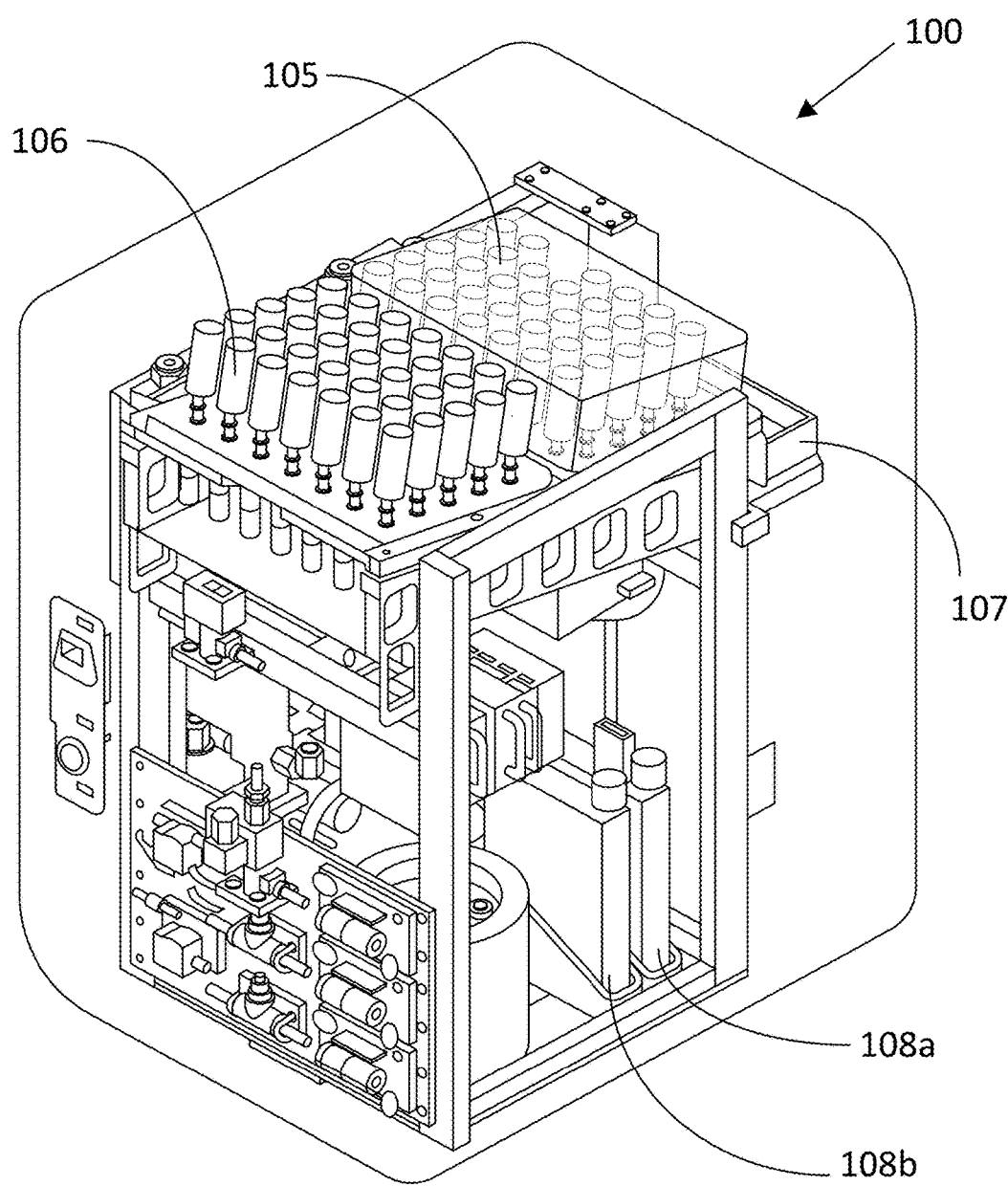
FIG. 1C illustrates an alternative view of the beverage mixture dispensing system of FIG. 1A without its casing, in accordance with specific embodiments disclosed herein.

FIG. 1A illustrates an example of a beverage mixture dispensing system in the form of a device 100, in accordance with specific embodiments of the invention. FIG. 1A illustrates an example of the external appearance of the device 100 and FIGS. 1B and 1C illustrates an example of some of the internal components that can be part of the device 100. In some embodiments, the device 100 can be used for beverage dispensing as well as a wide variety of other fluid mixture dispensing. The beverage mixture dispensing device 100 can be a countertop or consumer electronic device or a larger device installed in a restaurant or other commercial business.

Beverage mixture dispensing systems in accordance with this disclosure, such as device 100, can include various internal components within a casing, such as casing 102. The casing can be a protective outer casing that houses various internal components of the system, such as the components illustrated in FIGS. 1B and 1C. These internal components can include solvent reservoir(s) (e.g., water reservoir(s) and/or alcohol reservoir(s)) such as solvent reservoirs 108a and 108b shown in FIG. 1C, ingredient reservoirs, such as ingredient reservoir(s) 106, a cartridge for the ingredient reservoirs, such as cartridge(s) 105, mixing areas (e.g., mixing channels), mixing chambers, heat exchangers (e.g., heaters/chillers), and/or dissolution chamber(s) as well as various fluid moving mechanisms (e.g., valves, actuators, pumps, etc.). The cartridge(s), such as cartridge 105, can be removable from the device so that many ingredient reservoirs can be refreshed with a single cartridge. The cartridges can also include a dispensing interface which is configured to mate with a receiving interface of the beverage mixture dispensing system. The beverage mixture dispensing system can include a mixing area fluidly connected to the solvent reservoir(s) and the ingredients in the cartridge via the dispensing interface. As shown in FIG. 1C, in which cartridge 105 is partially transparent, each cartridge can include over 20 ingredient reservoirs. Fluid mixture dispensing system 100 can also include a user interface 103 so that a user can control the device. For example, a user can select a beverage to be made by device 100 via the user interface 103, such as a display, a keyboard, a touch pad and/or a touch screen. Fluid mixture dispensing system 100 can also include one or more controllers configured to execute instructions to control the various components of the device and to cause the device to perform the functions described in this disclosure.

The mixing of a beverage can begin with a system (e.g., a controller of the system) receiving a request for a beverage from a user. In some embodiments, the request for the beverage is received via a user interface. In some embodiments, the user interface includes a graphical user interface such as a touch screen. In some embodiments, the user interface is enabled to display the request and/or any modifications that are made to the request (e.g., by a user via the user interface). For example, if a user requests a soda, the user interface optionally and/or selectively displays options to modify the soda, such as an amount of sugar to be added, a carbonation level, an overall volume, and/or a temperature, among others. In some embodiments, preparation of the requested beverage is according to a predefined beverage mixture selected from a library of predefined beverage mixtures. In some embodiments, the library of predefined beverage mixtures (e.g., names of the predefined beverage mixtures, and/or formulas for the predefined beverage mixtures) is able to be displayed on the user interface for user selection. In some embodiments, the library of predefined beverage mixtures is stored remotely from the beverage mixture dispensing system and is later sent or uploaded to the beverage mixture dispensing system. In some embodiments, the library of predefined fluid mixtures is sent to the controller and is stored in a memory of the controller. In some embodiments, the requested beverage mixture includes ingredient modifications made to a selected predefined beverage mixture. In some embodiments, the user makes the ingredient modifications using the user interface.

In some embodiments, the library of predefined beverage mixtures is a library containing a list of components (e.g., chemical compounds, such as ingredients and/or solvents) and corresponding amounts of each component for each predefined beverage mixture in the library. The list of components and corresponding amounts of each component for each predefined beverage mixture can be obtained from prior chemical analysis of the predefined beverage mixture. For example, a glass of Chardonnay with a particular recognizable style or variety can be defined by a constituent list of certain amounts of chemical components (such as acids, sugar solutions, etc.) that are mixed into a larger mixture of water and ethanol to form the glass of Chardonnay. Thus, any particular fluid mixture (e.g., wine, soda, perfume, etc.) can be assembled from a defined list of components and corresponding amounts of each component, such as from a chemical analysis of the particular fluid mixture. In some embodiments, the systems disclosed herein accept the predefined fluid mixture information (i.e., a recipe for each of the predefined fluid mixtures) digitally and then translate that information into a control process (e.g., control of mechanical/electromechanical valves or pumps) that dispenses the list of components in the corresponding amounts to form the requested fluid mixture. In various embodiments, the recipe for a predefined fluid mixture includes additional control information, such as a sequencing of operations, a description of one or more flow paths to be used, temperature requirements, and/or control of other parts of the fluid dispensing system as required to prepare the predefined fluid mixture.

Beverage mixture dispensing systems in accordance with specific embodiments of this disclosure can, in response to receiving a request for a beverage mixture, conduct various actions to mix the beverage. Such beverage mixing dispensing systems can conduct various actions to mix a beverage comprising one or more solvents from a solvent reservoir, such as solvent reservoirs 108a and 108b, and an ingredient from an ingredient reservoir, such as ingredient reservoir 106, and dispense the beverage into a vessel such as the wine glass 104 shown in FIG. 1. The system could be configured to optionally and/or selectively control one or more of the following actions: (1) flow a predetermined amount of at least one solvent from at least one solvent reservoir (e.g., a predetermined amount of water from a water reservoir and/or a predetermined amount of alcohol from an alcohol reservoir) and flow a predetermined amount of at least one ingredient from at least one ingredient reservoir to at least one mixing area (e.g., a mixing channel) to form an intermediate fluid mixture; (2) flow a predetermined amount of at least one solvent from at least one solvent reservoir (e.g., water from a water reservoir and/or alcohol from an alcohol mixture) to a final mixing chamber; (3) flow the intermediate fluid mixtures, if any, to the final mixing chamber; and (4) dispense the mixed beverage in the final mixing chamber into a vessel for consumption. With reference to device 100, the mixing area could be a set of mixing channels beneath a plate 140 (as described below), the final mixing chamber could be mixing chamber 107, and the vessel could be wine glass 104.

In some embodiments, the system includes at least one solvent reservoir containing at least one solvent. In some embodiments, the at least one solvent comprises water, alcohol, ethyl lactate, and/or propylene glycol. In some embodiments, the at least one solvent comprises a sweetener such as glucose, sucrose, of fructose, or an artificial sweetener such as acesulfame K dissolved in water. The at least one solvent reservoir supplies the at least one solvent to the fluid mixture to be dispensed. For example, solvent reservoirs 108a and 108b in FIG. 1C. In some embodiments, the system includes a plurality of solvent reservoirs (e.g., one or multiple water reservoirs, one or multiple alcohol reservoirs, one or multiple propylene glycol reservoirs, one or multiple ethyl lactate reservoirs, and/or combinations of the foregoing, among other variations and/or types of solvents). In various embodiments, any one of the at least one solvent in the at least one solvent reservoir is optionally and/or selectively diluted. For example, an alcohol reservoir contains 95% alcohol, not 100% alcohol.

In some embodiments, the at least one solvent reservoir supplies solvent (e.g., any one or more of the at least one solvent) to the fluid mixture to be dispensed. For example, a water reservoir is able to supply water to the fluid mixture to be dispensed. In some embodiments, a solvent reservoir comprises a solvent container housed within the fluid mixture dispensing system to supply one or more solvents to the system. The one or more solvents are able to be used to dissolve or carry various other ingredients to form the requested fluid mixture. For example, the solvent could mix with ingredients dispensed from the ingredient reservoirs in a cartridge in a mixing area to form the requested fluid mixture. In some embodiments, in response to receiving a request for a fluid mixture, the system (e.g., via a controller of the system controlling pumps and/or valves) flows a predetermined amount of at least one solvent from at least one solvent reservoir to at least one mixing channel to form an intermediate fluid mixture.

Figure 2A:
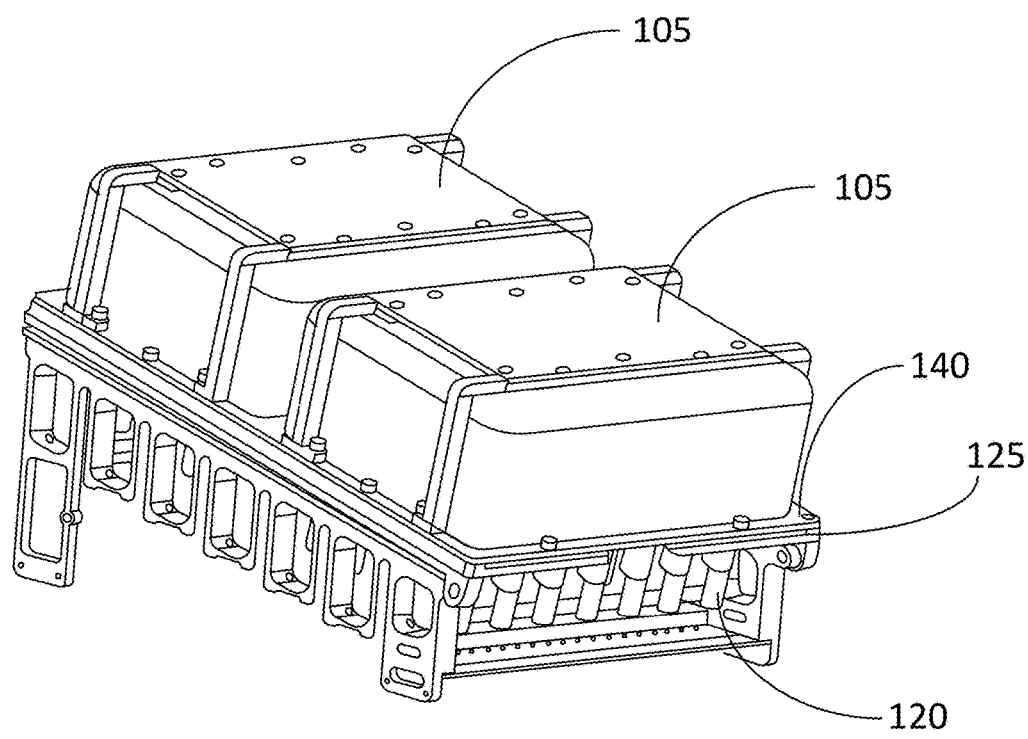
FIG. 2A illustrates an example of detachable cartridges of a beverage mixture dispensing system, in accordance with specific embodiments disclosed herein.
Figure 2B:
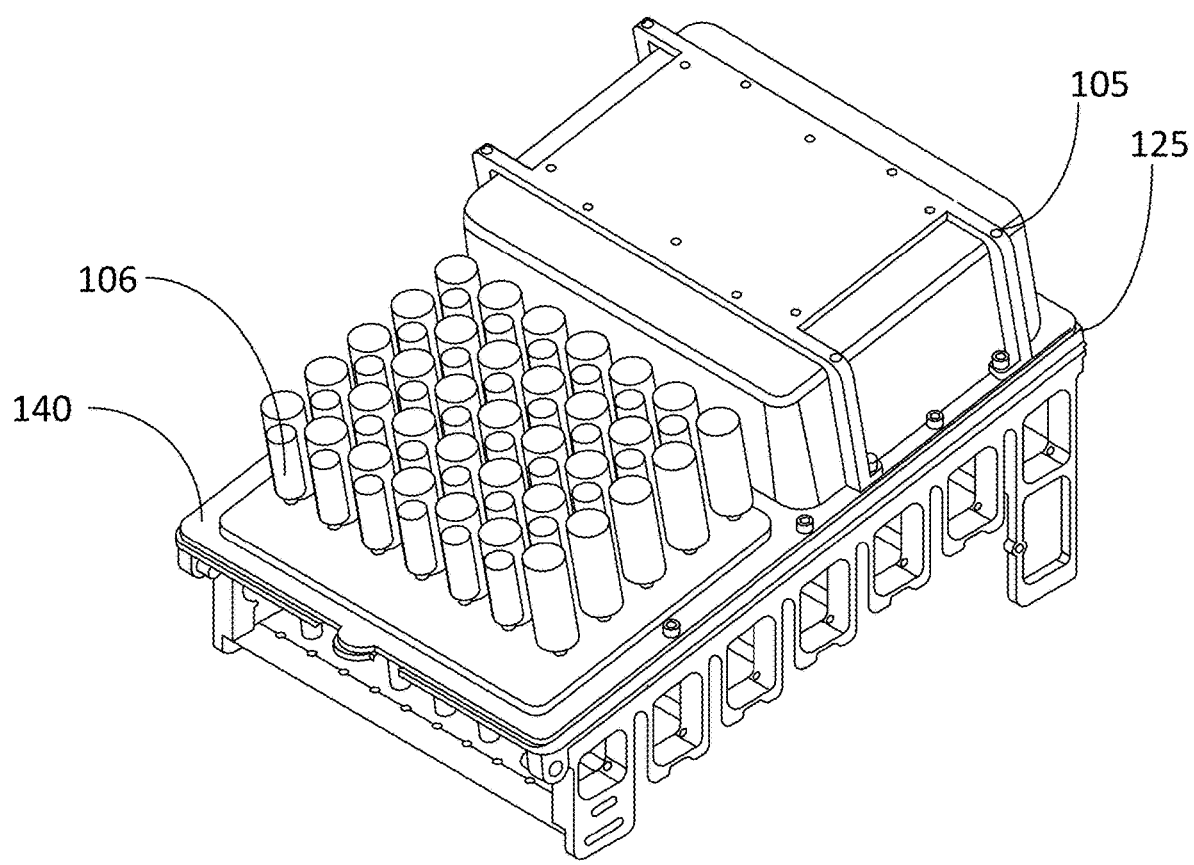
FIG. 2B illustrates an example of the inside of a detachable cartridge of a beverage mixture dispensing system, in accordance with specific embodiments disclosed herein.

In some embodiments, ingredients stored in ingredient reservoirs are ported to respective valves beneath the ingredient reservoirs. For example, ingredients from a cartridge 105 as in FIG. 2A could be ported to valves controlled by actuators 120 such that the ingredients are dispensed through plate 140. In some embodiments, the valve and ingredient reservoir assembly are interfaced with actuators (e.g., solenoids), such as actuators 120 as illustrated in FIGS. 2A and 2B, that are connected to a base plate, such as base plate 125 as illustrated in FIG. 2A and FIG. 2B. The base plate 125 and plate 140 could serve as part of the dispensing interface of the cartridge and the receiving interface of the device with the cartridges being detachable for when the ingredient reservoirs of the cartridge are depleted. The valves and interface could be as described in U.S. Provisional Patent Application No. 63/146,461 filed Feb. 5, 2021, which is incorporated by reference herein in its entirety for all purposes.

In some embodiments, the ingredient reservoirs (and the respective valves) can open to a mixing area such as a mixing channel. In some embodiments, a plurality of ingredient reservoirs is fluidly connected to a single mixing channel. In various embodiments, one mixing channel is fluidly connected to one or more other mixing channels. In some embodiments, a first mixing channel is fluidly connected to a first plurality of ingredient reservoirs, and a second mixing channel is fluidly connected to a second plurality of ingredient reservoirs. For example, a first mixing channel is fluidly connected to 5-20 ingredient reservoirs, and a second mixing channel is fluidly connected to 5-20 of the same or of different ingredient reservoirs. In various embodiments, at least one solvent (e.g., water and/or ethanol) flows through a mixing channel and collects any ingredient dispensed into the mixing channel. In some embodiments, the at least one solvent is dispensed into the mixing channel to remove any leftover ingredients (e.g., to purge or flush the mixing channel). In various embodiments, the at least one solvent is dispensed into the mixing channel prior to dispensing any ingredients into the mixing channel to "wet" the mixing channel (e.g., to make it easier for subsequently dispensed ingredients to flow through the mixing channel). In some embodiments, one or more mixing channels are formed into the bottom of a plate, such as plate 140 as illustrated in FIG. 2A. All the one or more mixing channels are optionally and/or selectively fluidly connected to one or more solvent reservoirs and to a mixing chamber. For example, in some embodiments, solvent enters at least one mixing channel, and at least one ingredient from at least one ingredient reservoir flows into the at least one mixing channel to form an intermediate fluid mixture with the solvent.

In some embodiments, a mixing area (e.g., a mixing channel) and/or mixing chamber is fluidly connected to valve outputs of the ingredient reservoirs such that a valve opening results in an ingredient flowing to a mixing area (e.g., a mixing channel) and/or mixing chamber. In some embodiments, the controller is configured to open a particular valve of a particular ingredient reservoir for a time duration based on one or more of the pressure in the pressurized chamber, the physical flow characteristics (e.g., the viscosity, which may be temperature-dependent) of the ingredient in the particular ingredient reservoir, and/or a diameter of the opening of the particular valve to control a flow of a predetermined amount of the ingredient in the particular ingredient reservoir to be dispensed. In further embodiments, for a particular ingredient in a particular ingredient reservoir, the system is calibrated to dispense/flow a predetermined amount of the particular ingredient to a mixing area (e.g., a mixing channel) and/or mixing chamber based on the pressure in the pressurized chamber, the physical flow characteristics of the particular ingredient, and/or a diameter of the opening of the valve of the particular ingredient reservoir (or a diameter of an orifice of the particular ingredient reservoir as explained below). In various embodiments, a time interval that a valve is open proportionally corresponds to amounts/concentrations of at least one ingredient of a list of ingredients of a requested fluid mixture (e.g., as obtained from a chemical analysis of the components required to produce the requested fluid mixture).

Figure 3:
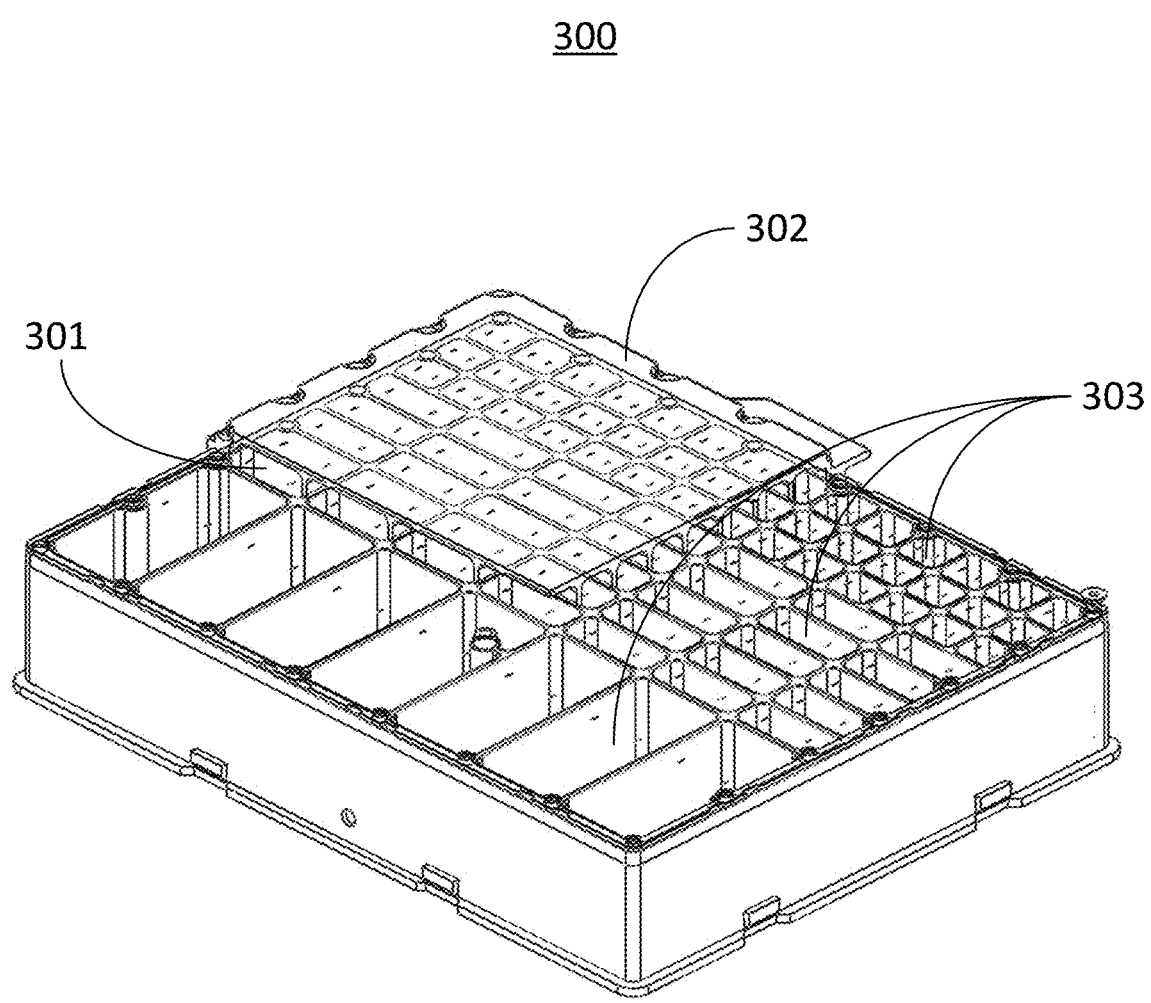
FIG. 3 illustrates a cut away view of the inside of a detachable ingredients cartridge for a beverage mixture dispensing system, in accordance with specific embodiments disclosed herein.

In some embodiments, at least one ingredient reservoir is packaged in an ingredient cartridge such as ingredient cartridge 300 in FIG. 3. In some embodiments, the system includes at least one ingredient cartridge. In further embodiments, the system includes two or more ingredient cartridges. For example, FIG. 2A illustrates two ingredient cartridges. In some embodiments, an ingredient cartridge includes a plurality of ingredient reservoirs. In some embodiments, at least one ingredient cartridge is configured to dispense a predetermined amount of at least one ingredient from at least one ingredient reservoir to a mixing area (e.g., a mixing channel) or a mixing chamber. In some embodiments, the at least one ingredient cartridge is removably attached to the fluid mixture dispensing system so that the at least one ingredient cartridge is refillable, replaceable, serviceable, and/or recyclable. In some embodiments, the fluid mixture dispensing system is able to operate with an ingredient cartridge missing (e.g., not installed), partly empty (e.g., only some ingredient reservoirs empty), and/or (fully) empty.

In some embodiments, at least one ingredient cartridge is pressurizable and/or includes a respective pressurized chamber inside the at least one ingredient cartridge (e.g., a respective interior chamber). For example, ingredient cartridge 300 includes a pressurized chamber 301 which is exposed as casing 302 of ingredient cartridge 300 has been partially removed in FIG. 3. References herein to a pressurized chamber refer to this pressurized chamber of the ingredient cartridge, whether it is, in some embodiments, the ingredient cartridge itself, or whether it is, in other embodiments, an interior chamber of the ingredient cartridge. The pressurized chamber houses a plurality of ingredient reservoirs such that a pressure (e.g., a pressure of gas in the pressurized chamber) is applied to the ingredient reservoirs. In some embodiments, the system (e.g., the controller) is configured to monitor (such as with a pressure sensor) and/or to control the pressure in the pressurized chamber. In various embodiments, the pressurized chamber is pressurized such that when the valve of one of the ingredient reservoirs is opened, the ingredient stored in that ingredient reservoir flows (at least in part in response to the pressure) out of the ingredient reservoir towards a mixing area (e.g., a mixing channel), and/or a mixing chamber. In further embodiments, the pressurized chamber is raised above a specified minimum pressure prior to when any of the valves of the ingredient reservoirs are opened. In some embodiments, an inert gas, such as argon, is added to this chamber to protect ingredients from oxidation/degradation.

In some embodiments, an ingredient is stored in respective one of a plurality of ingredient reservoirs in a cartridge. According to various embodiments, each of the ingredient reservoirs is of one or more types, such as: a bladder bag; a syringe; a gravity dispense chamber; a pellet dispenser; a pierceable volume; and any other container used for a solid (including crystalline, powdered, or other forms of a solid), a liquid, or a gas. In some embodiments, all the ingredient reservoirs are of the same type. In other embodiments, the ingredient reservoirs are of two or more types. In further embodiments, an ingredient cartridge contains two or more types of ingredient reservoirs. In some embodiments, the system includes a plurality of ingredient reservoirs. In other embodiments, the system includes solely a single ingredient reservoir. According to various embodiments, ingredient reservoirs are of one or more sizes, such as (for liquid volume measurements) one ounce, two ounces, four ounces, eight ounces, 16 ounces, 32 ounces, or any other size. In some embodiments, all the ingredient reservoirs in an ingredient cartridge are of a same size; in other embodiments, an ingredient cartridge contains ingredient reservoirs of two or more sizes, such as a small (e.g., one ounce or two ounce), a medium (e.g., four ounce or eight ounce), and a large (e.g., 16 ounce or 32 ounce) size. For example, a size of a particular ingredient reservoir is selected according to expected requirements for the ingredient to be stored in the ingredient reservoir. In various embodiments, two or more ingredient reservoirs in an ingredient cartridge contain the same ingredient.

FIG. 3 illustrates a cut away view of the inside of a detachable ingredients cartridge 300 for a beverage mixture dispensing system. Cartridge 300 includes at least 6 large ingredient reservoirs, 35 medium sized reservoirs and 42 small sized reservoirs. The reservoirs vary in size since certain chemicals are used more or less frequently when making an expected array of beverages. For example, a fatty acid ingredient may be consumed in the micro-liter scale on a per beverage basis while a concentrated sweetener or fruit extract ingredient is consumed on a milli-liter scale on a per beverage basis. The ingredients in the ingredient reservoirs can be stored in various forms. For example, in the example of FIG. 3, the ingredients are stored in the form of concentrated liquids. The ingredient reservoirs in a cartridge, such as cartridge 300, are fluidly isolated within the casing 302 in that the ingredients can be stored in liquid form and will not mix.

In some embodiments, the chemical analysis of a fluid mixture provides a detailed list of ingredients that make up the fluid mixture and a cartridge can be designed to include all the ingredients from a diversity of such detailed lists. As such, the cartridge can include various ingredients to match these detailed lists such as salts, sweeteners, food grade acids, aromatics, food grade bases, alcohols, aldehydes, terpenes, sulfides, esters, fatty acids, ketones, lactones, and phenolics. The cartridge can also include extracts, concentrates, and oils combined to produce fruit and other flavors. The cartridge can also include additives such as chemicals for altering a color of a beverage, vitamins, stimulants, and other additives.

As stated, a cartridge can be designed to include all the chemicals in a large set of desired beverages which have been subjected to chemical analysis. The chemicals can be stored in independent ingredient reservoirs. The cartridge can store as many as 1,000 individual ingredients to create a large diversity of beverages. However, in various embodiments, certain ingredients serve as suitable organoleptic substitutes for esoteric ingredients in specific beverages. As such, careful identification of suitable organoleptic substitutes can provide increased beverage diversity for a cartridge with a fixed number of ingredient reservoirs. Through extensive experimentation, the inventors have found that a system which includes at least 20 ingredient reservoirs produces a library of over 500 beverages.

Generally, an increase in the number of ingredient reservoirs and independently stored ingredients in a given cartridge will contribute to a combined increase in either the diversity of beverages that can be made by a device using the cartridge or an increase in the number of beverages that can be made before the cartridge is depleted. However, as the number of ingredient reservoirs increase the mechanical complexity of the cartridge, particularly the dispense interface, begins to dramatically increase. Furthermore, after a certain point the marginal benefit of an additional ingredient being added to the cartridge in terms of the increased diversity of beverages that can be made based on that additional ingredient begins to precipitously decline. As such, the inventors have determined an upper limit of approximately 1,000 individual ingredient reservoirs for a cartridge before the drawbacks of increased mechanical complexity outweigh the benefit of additional independent ingredients.

In various embodiments, any of the ingredients are a liquid, a crystalline form, a solid, a gas, and/or a combination thereof. For example, the ingredients include an amount of an acid in liquid form, an amount of a sugar in powdered/granule form, and/or an amount of compressed nitrogen or $CO_2$ in gas form. In the example of FIG. 3, all the ingredients are stored as concentrated liquids. The ingredient reservoirs in a cartridge, such as in FIG. 3, could store ingredients in the form of at least 20 separate ingredients stored as at least 20 concentrated liquids in the at least 20 ingredient reservoirs.

The ingredients can be stored in ingredient reservoirs in various compositions. The ingredients can be pure ingredients or ingredient mixtures. As used herein the term "ingredient" includes an "ingredient mixture." An ingredient mixture can include at least one primary/functional ingredient. A primary/functional ingredient can be at least one of a solid, liquid, or a gas. An example of a primary/functional ingredient can be chemical compounds. In specific embodiments, the ingredients could be stored in the form of at least 20 molecular entities independently suspended in liquid water in the at least 20 ingredient reservoirs. In specific embodiments, the liquid ingredients could be stored as at least one molecular entity independently suspended in a solvent where the solvent is a solvent from the one or more reservoirs of the device. In specific embodiments, the liquid ingredients could as be stored as pure molecular entities in liquid form.

In some embodiments, the ingredient mixture can include various concentrations of chemical compounds. In some embodiments, an ingredient mixture can include at least one solvent. The at least one solvent can be any combination of solvents disclosed herein. For example, an ingredient mixture in an ingredient reservoir can be a mixture of citric acid (primary/functional ingredient) and water at a particular concentration. Another ingredient mixture can be a mixture of potassium sulfate (primary/functional ingredient), water, and ethanol. As discussed herein, these ingredients/ingredient mixtures can get dispensed into a fluid stream (which could be a mixture in itself of solvent (e.g., water and/or ethanol)) and combined together to form an intermediate fluid mixture. In some embodiments, an ingredient mixture can also include at least one of a solvent (e.g., water and/or an alcohol) and an additive ingredient. An additive ingredient can be at least one of a surfactant, preservative, or an emulsifier/stabilizer. Examples of surfactants include anionic surfactants (e.g., sodium lauryl sulfate and/or sodium laureth sulfate among others), and nonionic surfactants (e.g., cocamide monoethanolamine and/or cocamide diethanolamine, among others). Examples of preservatives include sodium benzoate and/or citric acid, among others. Examples of emulsifiers/stabilizers include gellan gum and/or guar gum, among others.

In some embodiments, because one or more of the ingredients required to create a particular fluid mixture are used in small amounts (e.g., less than 0.1 mL, less than 0.01 mL, less than 0.001 mL, or as small as 50 uL), a high level of repeatability and precision is required when dispensing ingredients to be combined with one or more solvents to form the particular fluid mixture. In some embodiments, a predetermined amount of at least one ingredient required to form the particular fluid mixture is at most 3 L, at most 2 L, at most 1 L, at most 500 mL, at most 250 mL, at most 100 mL, at most 50 mL, at most 25 mL, at most 10 mL, at most 5 mL, at most 1 mL, at most 0.5 mL, at most 0.1 mL, at most 0.01 mL, at most 0.001 mL, or at most 50 uL In specific embodiments of the invention, the high level of repeatability can be referred to as a minimum controllable dispense volume for the device. In specific embodiments of the invention, the minimum controllable dispense volume from the ingredient reservoirs to the mixing area is less than 100 microliters. In specific implementations of the invention, the minimum controllable dispense volume of the device is 50 uL.

In specific embodiments of the invention, the ingredients are concentrated liquids stored in specific volumes and concentrations to maximize both the diversity and number of beverages that can be made from a given cartridge. Furthermore, the overall beverage mixture dispensing system can be designed such that high volume ingredients are stored in solvent reservoirs with larger capacities than even the largest ingredient reservoirs in the cartridge. The concentration and volumes of the liquids can be selected based on various factors including the solubility limit of the ingredient, the minimum controllable dispense volume of a specific ingredient from the cartridge into the device, the minimum and maximum concentration of the ingredient in various drinks, and the size of the average beverage made using the device.

In general, increasing the concentrations of the ingredients in the ingredient reservoirs is desirable because a user will be able to make a larger number of beverage servings from a set amount of a liquid ingredient in the cartridge. For example, if an ingredient is at a concentration of 10 g/ml in a 100 ml sized ingredient reservoir, and if the drink requires 1 g of the ingredient in each beverage being served, the beverage mixture dispensing system can serve 1,000 servings of the beverage before the cartridge needs to be replaced. However, if you can concentrate the ingredient to 100 g/ml in the 100 ml cartridge, then you can get 10,000 servings of the beverage to be served.

However, in specific embodiments, there are limits on how concentrated an ingredient can be in an ingredient reservoir. For example, the concentration of a concentrated liquid ingredient suspended in a solvent cannot be increased beyond the solubility limit of the ingredient in that solvent (e.g., a sugar can be stored at a concentration of 4 g/ml in water while a salt can be stored at a concentration of 0.15 g/ml in water). Additionally, a buffer on the absolute limit can also be applied to prevent crystallization of the ingredient over time. In specific embodiments, the buffer can be 20-50% of the limit. As another example, the minimum controllable dispense of the beverage mixture dispensing system can set an upper bound on the allowable concentration. For example, if the minimum controllable dispense from the beverage mixture dispensing system is 50 ul and the final beverages made by the beverage mixture dispensing system is 100 ml, the minimum concentration of the ingredient in the final beverage will set a limit on the maximum allowable concentration of the minimum concentration (in a beverage)×100 ml/15 ul.

For the above reasons, in specific embodiments of the invention, the ingredients are stored in different concentration ranges based on the chemical class to which they belong. For example, a concentrated salt can be stored as a first concentrated liquid having a concentration of less than 0.15 grams per milliliter while a concentrated food grade acid can be stored as a second concentrated liquid having a concentration less than 1.3 grams per milliliter. The concentration of specific ingredients are also determined, in specific embodiments, by the minimum concentration of the ingredient in a given beverage and the minimum controllable dispense volume of the device as described above.

In specific embodiments of the invention, the volume of each liquid ingredient stored in the cartridge is set within a range. In specific embodiments of the invention, the ingredient reservoirs of the cartridge each store at least 50 milliliters of a concentrated liquid and less than 500 milliliters of a concentrated liquid. These limits are important because they balance the overall weight of the cartridge with the number of beverages that can be made using ingredients with high usage volumes.

In specific embodiments of the invention, a careful selection of the ingredients for a cartridge can produce a wide diversity of beverages from a small set of ingredients. The cartridge can include a set of chemicals in an order of primacy based on how common the ingredient is to a wide variety of beverages and how close of a substitute it is for specific ingredients. A typical ingredient cartridge will include at least a food grade acid (e.g., acetic acid, citric acid, and/or tartaric acid), and at least one salt (e.g., sodium chloride). The cartridge can also include a sweetener such as glucose, sucrose, fructose, or zero calorie high intensity sweeteners such as erythritol, acesulfame k, etc. The cartridge content can also be selected based on the solvents available to a given beverage mixture dispensing system in which the cartridge will be used. For example, if a diluted glucose solvent reservoir were used in combination with the cartridge, the cartridge may not need to store a sweetener, or could at least avoid the need for an ingredient reservoir dedicated to glucose. The cartridges can also include aromatics such as esters for fruit flavors or terpenes for citrus flavors. For example, the cartridge could include ethyl acetate, isobutyl acetate, and/or terpenes such as limonene. The cartridge could also include food grade bases to adjust the pH of the beverage. Generally, the cartridge will include one base as they are approximately interchangeable from an organoleptic perspective. For example, the cartridge could include a single base selected from sodium phosphate dibasic or potassium phosphate tribasic. The cartridge can also include additives such as stimulates, vitamin supplements, protein supplements, and other additive ingredients. An additive ingredient can be at least one of a surfactant, preservative, or an emulsifier/stabilizer. Examples of surfactants include anionic surfactants (e.g., sodium lauryl sulfate and/or sodium laureth sulfate among others), and nonionic surfactants (e.g., cocamide monoethanolamine and/or cocamide diethanolamine, among others). Examples of preservatives include sodium benzoate and/or citric acid, among others. Examples of emulsifiers/stabilizers include gellan gum and/or guar gum, among others.

FIG. 4 presents an example cartridge loadout 400 for a cartridge having twenty ingredients and a concordance with what beverages can be made from those ingredients. The loadout includes the solvents for a particular device with the label (solvent) and carbon dioxide with the label (separate $CO_2$ tank) to refer to the fact that these components are not in the ingredients cartridge but are necessary to maintain the listed concordance. The ingredients are listed in terms of their primacy for the provided concordance (i.e., ingredients shared by the most beverages are listed at the top). For example, the solvent ethanol is presented lower in the concordance as it is used for a smaller class of beverages and because, in some embodiments, the ingredients associated with alcoholic beverages could be removed from the cartridge entirely. The concordance lists beverages in the second column that can be made using only a subset of ingredients selected from the ingredients that appear listed above the beverage in the first column.

As illustrated, cartridge loadout 400 is in accordance with specific embodiments disclosed herein. Cartridge loadout 400 includes a concentrated salt in the form of sodium chloride and a concentrated food grade acid in the form of citric acid. These ingredients are listed towards the top of the concordance because they are required for the largest number of beverages in the concordance. While the concordance stops after 25 ingredients, these ingredients are required for many beverages that would be present on the list as additional ingredients were added. While loadout concordance 400 is provided with reference to a device that has a sweetener in a solvent reservoir (e.g., sucrose), the cartridge still includes additional sweeteners in the form of grape juice concentrate, erythritol, or acesulfame k which are not used as frequently as sucrose. In alternative embodiments, the sucrose is stored in more concentrated form on the cartridge and there is not a separate sweetener solvent reservoir.

Various cartridge loadouts can be selected based on various factors including which solvents are available in the device, which classes of beverages an associated device is designed to produce, which ingredients are organoleptic substitutes, what volume the ingredients are used in, and which ingredients most quickly expand the concordance (i.e., which ingredients create the largest diversity of potential beverages). The allowable degree of difference for particular substitutes can be relaxed based on the quantity of beverages that utilize the substitutes, or the amount of the ingredient used in each beverage. For example, in specific embodiments of the invention, a specific fatty acid among two fatty acids which are used in very small concentrations may have a degree of organoleptic substitutability relaxed when selecting a cartridge loadout since they are used in such small amounts as compared to two sweeteners which are used in high concentrations in many beverages.

While different cartridges can have different loadouts for different target classes of beverages, there are certain classes of chemicals that are common across nearly all classes of beverages that a device could be expected to produce. In specific embodiments of the invention, the ingredient cartridge will include a first reservoir of a concentrated food grade acid and second reservoir with a concentrated salt. These ingredients are prime for expanding the concordance along with a concentrated sweetener. However, sweeteners are used in such high volumes that a dedicated solvent reservoir with a concentration of sweetener that is at the average of sweetened beverages can be used instead of a dedicated cartridge of sweetener. The concentrated food grade acid can be citric acid or tartaric acid. Generally, a cartridge having at least 20 ingredient reservoirs will include both citric acid and tartaric acid given that both the ingredients are found across a large diversity of beverages, and because they are not organoleptic substitutes. A cartridge with at least 20 ingredients will also likely include a third reservoir of a concentrated aromatic, a fourth reservoir of a concentrated ester, a fifth reservoir of a concentrated terpene, and/or a sixth reservoir of a concentrated food grade base because specific chemicals selected from these groups have a significant impact on expanding the diversity of beverages that can be made by a given beverage mixture dispensing system, and because the chemicals from these groups are generally not organoleptic substitutes.

Certain classes of beverages have divergent requirements for expanding the diversity of beverages from within that class. As such, more ingredient reservoirs than average can be dedicated to making such beverages in a cartridge that is designed to include that class of beverages. For example, if the cartridge were meant to facilitate wine making, the cartridge could include a first reservoir of a concentrated food grade acid in the form of acetic acid, a second reservoir with a concentrated salt, and a third reservoir of concentrated ethyl acetate. Extensive experimentation has found that these requirements are either within the common ingredients of all wines or are sufficiently organoleptic substitutes for the ingredients of all wines.

FIG. 5 includes a sample cartridge loadout 500 for a cartridge that is capable of dispensing ingredients for making white wines of various varieties. Extensive experimentation has found that the provided list of ingredients is sufficient to make a substantial number of white wine varieties including Chardonnay, Sauvignon Blanc, Moscato, Riesling, etc. The cartridge loadout assumes that all the ingredients from cartridge loadout 400 are available. The ingredients listed in loadout 500 can all be stored in individual ingredient reservoirs. However, in specific embodiments of the invention, the ingredients that are commonly listed in a row of the table can be combined into a single ingredient reservoir and stored as an ingredient mixture in a single ingredient reservoir. Furthermore, in specific embodiments of the invention, the ingredients that are listed below the first aldehyde can all be combined and stored as an ingredient mixture in a single ingredient reservoir if they are listed sequentially and are from the same class. In devices using a cartridge with loadout 500, experimentation has found that the loss of flexibility at matching specific chemical compositions using these ingredients individually as opposed to grouping them as an ingredient mixture does not tend to provide a distinguishable organoleptic experience for the average user.

FIG. 6 includes a sample cartridge loadout 600 for a cartridge that is capable of dispensing ingredients for making red wines of various varieties. Extensive experimentation has found that the provided list of ingredients is sufficient to make a substantial number of white wine varieties including Cabernet Sauvignon, Pinot Noir, Syrah, Merlot, etc. The cartridge loadout assumes that all the ingredients from cartridge loadout 500 are available. The ingredients listed in loadout 600 can all be stored in individual ingredient reservoirs. However, in specific embodiments of the invention, the ingredients that are commonly listed in a row of the table can be combined into a single ingredient reservoir and stored as an ingredient mixture. Furthermore, in specific embodiments of the invention, the ingredients that are listed can all be combined and stored as an ingredient mixture in a single ingredient reservoir if they are listed sequentially and are from the same class. Experimentation has found that the loss of flexibility at matching specific chemical compositions using these ingredients individually as opposed to a group does not tend to provide a distinguishable organoleptic experience for the average user.

In specific embodiments of the invention, the selection of ingredients for individual reservoirs and for a cartridge overall area selected based on a desired set of "frameworks" for specific types of beverages such as wines, hard seltzers, flavored water, flavored sparkling water, rehydration drinks, electrolyte replacement, immunity beverage, energy drinks, cold teas, cold coffee, carbonated soft drinks, and cocktails. Generally, experimentation is used to find less than 100 compounds which are common amongst all beverages within the framework. For example, the wine framework includes 50 ingredients which are common among all wines. The frameworks can then be combined in a given cartridge and/or modified to make specific beverages within that framework in order to formulate a cartridge loadout. Experimentation has found that it is possible to select 100-125 different compounds split into less than 90 wells to form a wide body of drinks from each of the frameworks listed above.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

As used herein, the singular forms "a," "an," and "the" are intended to include the plural forms as well, unless the context clearly indicates otherwise. It is also to be understood that the term "and/or" as used herein refers to and encompasses any and all possible combinations of one or more of the associated listed items. It is further to be understood that the terms "includes, "including," "comprises," and/or "comprising," when used herein, specify the presence of stated features, integers, steps, operations, elements, components, and/or units but do not preclude the presence or addition of one or more other features, integers, steps, operations, elements, components, units, and/or groups thereof.

Certain aspects of the present disclosure include process steps and instructions described herein in the form of an algorithm. It should be noted that the process steps and instructions of the present disclosure could be embodied in software, firmware, or hardware and, when embodied in software, could be downloaded to reside on and be operated from different platforms used by a variety of operating systems. Unless specifically stated otherwise as apparent from the following, it is appreciated that, throughout the description, descriptions utilizing terms such as "processing," "computing," "calculating," "determining," "displaying," "generating" or the like, refer to the action and processes of a computer system, or similar electronic computing device, that manipulates and transforms data represented as physical (electronic) quantities within the computer system memories or registers or other such information storage, transmission, or display devices.

The present disclosure in some embodiments also relates to a device for performing the operations herein. This device may specially constructed for the required purposes, or it may comprise a general purpose computer selectively activated or reconfigured by a computer program stored in the computer. Such a computer program may be stored in a non-transitory, computer readable storage medium, such as, but not limited to, any type of disk, including floppy disks, USB flash drives, external hard drives, optical disks, CD-ROMS, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each connected to a computer system bus. Furthermore, the computing systems referred to in the specification may include a single processor may be architectures employing multiple processor designs, such as for performing different functions or for increased computing capability. Suitable processors include central processing units (CPUs), graphical processing units (GPUs), field programmable gate arrays (FPGAs), and ASICs.

The methods, devices, and systems described herein are not inherently related to any particular computer or other apparatus. Various general-purpose systems may also be used with programs in accordance with the teachings herein, or it may prove convenient to construct a more specialized apparatus to perform the required method steps. The structure for a variety of these systems can appear from the description above. In addition, the present disclosure is not described with reference to any particular programming language. It will be appreciated that a variety of programming languages may be used to implement the teachings of the present invention as described herein.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

The above description is presented to enable a person skilled in the art to make and use the disclosure and is provided in the context of a particular application and its requirements. Various modifications to the preferred embodiments will be readily apparent to those skilled in the art, and the generic principles defined herein may be applied to other embodiments and applications without departing from the spirit and scope of the disclosure. Thus, this disclosure is not intended to be limited to the embodiments illustrated but is to be accorded the widest scope consistent with the principles and features disclosed herein.

What is claimed is:

1. A beverage mixture dispensing system comprising:
   a solvent reservoir;
   a detachable cartridge having: (i) a casing; and (ii) at least 20 ingredient reservoirs located within the casing and storing at least 20 respective ingredients; and
   a mixing area fluidly connected to the solvent reservoir and the at least 20 ingredient reservoirs;
   wherein the at least 20 ingredient reservoirs include:
   a first reservoir storing a concentrated salt as the respective ingredient of the first reservoir;
   a second reservoir storing a concentrated food grade acid as the respective ingredient of the second reservoir, wherein the food grade acid is acetic acid; and
   a third reservoir storing concentrated ethyl acetate as the respective ingredient of the third reservoir.

2. The beverage mixture dispensing system of claim 1, wherein:
   the at least 20 ingredient reservoirs are fluidly isolated within the casing.

3. The beverage mixture dispensing system of claim 2, wherein:
   the at least 20 respective ingredients are stored as at least 20 concentrated liquids in the at least 20 ingredient reservoirs.

4. The beverage mixture dispensing system of claim 3, wherein:
   the at least 20 respective ingredients are stored as at least 20 molecular entities independently suspended in liquid water in the at least 20 ingredient reservoirs.

5. The beverage mixture dispensing system of claim 3, wherein:
   the solvent reservoir stores a solvent; and the at least 20 respective ingredients include at least one molecular entity independently suspended in the solvent in one of the at least 20 ingredient reservoirs.

6. The beverage mixture dispensing system of claim 1, wherein:
the at least 20 respective ingredients are stored as at least 20 concentrated liquids in the at least 20 ingredient reservoirs; and
the at least 20 ingredient reservoirs each store at least 50 milliliters of concentrated liquid and less than 500 milliliters of concentrated liquid.

7. The beverage mixture dispensing system of claim 6, wherein:
the concentrated salt is stored as a first concentrated liquid having a concentration less than 0.15 grams per milliliter; and
the concentrated food grade acid is stored as a second concentrated liquid having a concentration less than 1.3 grams per milliliter.

8. The beverage mixture dispensing system of claim 7, wherein:
a minimum controllable dispense volume from each of the at least 20 ingredient reservoirs to the mixing area is less than 100 microliters.

9. The beverage mixture dispensing system of claim 1, further comprising at least one of:
a sweetener in the solvent reservoir; and
a third reservoir of a concentrated sweetener.

10. The beverage mixture dispensing system of claim 1, wherein:
the at least 20 ingredient reservoirs further include one of: citric acid and tartaric acid.

11. The beverage mixture dispensing system of claim 1, wherein the at least 20 ingredient reservoirs include:
a fourth reservoir of a concentrated aromatic.

12. The beverage mixture dispensing system of claim 11, wherein the at least 20 ingredient reservoirs include:
a fifth reservoir of a concentrated ester.

13. The beverage mixture dispensing system of claim 12, wherein the at least 20 ingredient reservoirs include:
a sixth reservoir of a concentrated terpene; and
a seventh reservoir of a concentrated food grade base.

14. A detachable ingredients cartridge for a beverage mixture dispensing system, the detachable ingredients cartridge comprising:
a casing;
at least 20 ingredient reservoirs located within the casing and storing at least 20 separate respective ingredients; and
a dispensing interface for dispensing the at least 20 separate respective ingredients into the beverage mixture dispensing system;
wherein the at least 20 ingredient reservoirs include:
a first reservoir of a concentrated salt;
a second reservoir of a concentrated food grade acid, wherein the food grade acid is acetic acid; and
a third reservoir storing concentrated ethyl acetate.

15. The detachable ingredients cartridge of claim 14, wherein:
the at least 20 ingredient reservoirs are fluidly isolated within the casing.

16. The detachable ingredients cartridge of claim 15, wherein:
the at least 20 respective ingredients are stored as at least 20 concentrated liquids in the at least 20 ingredient reservoirs.

17. The detachable ingredients cartridge of claim 16, wherein:
the at least 20 respective ingredients are stored as at least 20 molecular entities independently suspended in liquid water in the at least 20 ingredient reservoirs.

18. The detachable ingredients cartridge of claim 14, wherein:
the at least 20 respective ingredients are stored as at least 20 concentrated liquids in the at least 20 ingredient reservoirs; and
the at least 20 ingredient reservoirs each store at least 50 milliliters of concentrated liquid and less than 500 milliliters of concentrated liquid.

19. The detachable ingredients cartridge of claim 18, wherein:
the concentrated salt is stored as a first concentrated liquid having a concentration less than 0.15 grams per milliliter; and
the concentrated food grade acid is stored as a second concentrated liquid having a concentration less than 1.3 grams per milliliter.

20. The detachable ingredients cartridge of claim 19, wherein:
a minimum controllable dispense volume from each of the at least 20 ingredient reservoirs is less than 100 microliters.

21. The detachable ingredients cartridge of claim 14, further comprising:
a third reservoir of a concentrated sweetener.

22. The detachable ingredients cartridge of claim 14, wherein:
the at least 20 ingredient reservoirs further include one of: citric acid and tartaric acid.

23. The detachable ingredients cartridge of claim 14, wherein the at least 20 ingredient reservoirs include:
a fourth reservoir of a concentrated aromatic.

24. The detachable ingredients cartridge of claim 23, wherein the at least 20 ingredient reservoirs include:
a fifth reservoir of a concentrated ester.

25. The detachable ingredients cartridge of claim 24, wherein the at least 20 ingredient reservoirs include:
a sixth reservoir of a concentrated terpene; and
a seventh reservoir of a concentrated food grade base.

26. An ingredients cartridge comprising:
at least 20 ingredient reservoirs storing at least 20 separate ingredients;
wherein the at least 20 ingredient reservoirs include:
a first reservoir of a concentrated salt;
a second reservoir of a concentrated food grade acid, wherein the concentrated food grade acid is acetic acid; and
a third reservoir of concentrated ethyl acetate.

27. The ingredients cartridge of claim 26, wherein:
the at least 20 respective ingredients are stored as at least 20 molecular entities independently suspended in liquid water in the at least 20 ingredient reservoirs.

* * * * *